Figure 1:
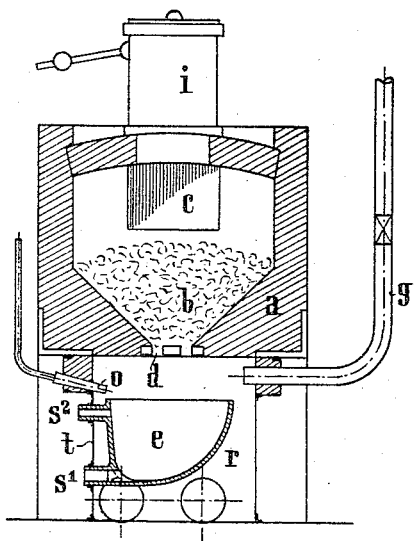

H. PAPE.
REDUCTION FURNACE.
APPLICATION FILED NOV. 28, 1913.

1,144,054.

Patented June 22, 1915.

UNITED STATES PATENT OFFICE.

HERMANN PAPE, OF OKER-IN-THE-HARZ, GERMANY.

REDUCTION-FURNACE.

1,144,054.

Specification of Letters Patent.

Patented June 22, 1915.

Application filed November 28, 1913. Serial No. 803,608.

*To all whom it may concern:*

Be it known that I, HERMANN PAPE, a citizen of the German Empire, and residing at Oker-in-the-Harz, Germany, have invented a certain new and useful Improved Reduction-Furnace, of which the following is a specification.

In my co-pending patent application, Serial No. 725893, I have described a furnace in which a chamber, which is completely closed when the furnace is working, is arranged under the furnace proper. This chamber primarily serves as a blast-box from which the blast is introduced under pressure through openings at the bottom of the furnace into the reducing chamber. The molten products or residues can flow away through the same openings. According to the said patent application the blast-box is made sufficiently large and so arranged that a collecting device used for catching the molten mass, e. g. a slag wagon or the like, can be accommodated therein. According to the said patent application this collecting device may be arranged in such manner that it can be pushed under the said chamber or blast-box which is made suitably low, or it may be suspended from the air-chamber or blast-box, a tight joint being made between the same in each case. The collecting device is emptied either intermittently or continuously; in the former case a slag wagon may be pushed out of the chamber when full and substituted by an empty wagon, and in the latter case the molten products may be run off out of the suspended or otherwise mounted collecting device into slag pots or the like placed in front thereof. In both these cases, *i. e.* when employing a slag wagon run into the said chamber, and when using the suspended collecting vessel for liquid slag and the like according to the said patent application, the working of the furnace can be impaired owing to the molten products issuing from the furnace congealing relatively rapidly at the surface of the molten material in the collecting device or vessel and forming stalagmite-like bodies between this collecting device and the openings of the furnace above the same.

A primary object of my invention is to obviate such disturbances in furnaces of the type described and, if desired, to bring about in one continuous operation the economically important separation of the valuable constituents of the molten material from the slag without having to smelt a second time.

Practical working with the furnace described in the said patent application has proved that this can be done without material change in the construction of the furnace provided that a hot flame is introduced into the blast-box between the openings in the bottom of the furnace and the collecting device or tank for the molten products or residues. Further, it has been found that this proviso can be fulfilled with relatively simple means without disturbing the working of the furnace; the essence of the present invention resides therein. Accordingly, a hot flame is introduced into the blast-box in such manner that it impinges with sufficient energy on the surface of the molten material in the collecting device, spreads over the same and constantly maintains its temperature so high that the formation of a congealed skin, or one undergoing the process of congealing, is avoided. In addition, the space between the surface of the molten material and the bottom of the furnace is, of course, also heated. The circumstance that the air requisite for working the furnace is diluted somewhat by the products of combustion of this hot flame does not materially hinder the working of the furnace because such dilution is always so small that the oxygen of the blast perfectly suffices for the smelting process, while the temperature of the blast is increased by the flame.

Figure 2:
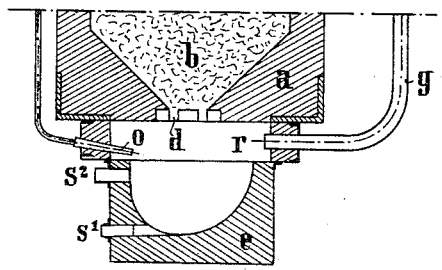
Figure 3:
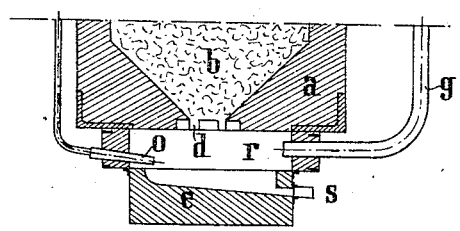

Some illustrative embodiments of the invention are represented by way of example in the accompanying drawing, wherein:

Figure 1 is a vertical section showing one furnace of the type described provided with means according to my invention, Fig. 2 is a like view of the bottom part of a furnace of modified construction provided with similar means, and Fig. 3 is a like view of the bottom of another modified furnace provided with similar means.

Referring first to Fig. 1 the furnace comprises the masonry body *a* which is charged with the charge *b* through the hopper *i*. The bottom of the body of the furnace is provided with slot-like openings *d* through which the blast enters into the charge, while the gaseous or vaporous products, *i. e.* metallic smoke and the like, are led away from the charge through the flue *c*. The air-chamber or blast-box *r* is closed all sides, and the blast is forced into it by way of the air pipe $g$. In this chamber $r$ is a slag wagon $e$ which can be run out and in through the door $t$ and is provided with two tap holes $s^1$ and $s^2$ formed as short pipes, the former being at the bottom and the latter near the top edge of the wagon. These pipes pass through the door $t$ and enable the molten products to flow out of the chamber $r$ into pots, channels, or the like.

According to my invention I provide the nozzle $o$ for blowing into the air-chamber or blast-box a mixture of gas and air, or an atomized liquid fuel and the requisite air for combustion, for forming an intensely hot flame which can be directed against the surface of the contents of the wagon and spreads out thereon.

The furnaces shown in Figs. 2 and 3 are arranged in substantially the same manner as that shown in Fig. 1, the principal difference being that the tank or collecting vessel $e$ is not inserted into the air chamber but is placed under the same, which is made correspondingly low, a tight joint being provided between the same. In the form shown in Fig. 2 the slag can be run off in a manner similar to that in the form according to Fig. 1. In the form shown in Fig. 3 the tank or collecting vessel $e$ is so shallow that all the molten products of the furnace can be run off continuously through the tap hole $s$ in order if desired to be separated in devices which are independent of the furnace.

The essence of the described forms of furnace is the introduction into the air-chamber or blast-box by means of one or more nozzles, burners or the like $o$ of the hot flame which plays over the surface of the molten mass in the collecting device $e$ and, as mentioned above, maintains it in a molten condition. The action of the hot flame can be observed through suitable peep holes in the air-chamber and regulated accordingly. The burner $o$ may of course be arranged movable.

According to the invention it is immaterial whether the charge $b$ smelted in the furnace $a$ contain considerable quantities of reducible compounds of volatile metals, to which reference is made in the said patent application, or not. It is to be understood that this invention is not limited to the working up of such materials. On the contrary, the invention essentially consists in inserting one or more hot flames in such manner into the air-chamber located below the furnace of the type described that the molten products running out of the openings in the bottom of the furnace are kept fluid until they flow out of the collecting device located under the air-chamber.

I claim:—

1. In a furnace for continuously working up a charge consisting of a mixture of reducing agents with substances containing reducible metallic compounds, a current of air passing through the charge from below upward, the combination with the reducing chamber having apertures in the bottom thereof, a blast-box located immediately below the reduction chamber, a pipe connected to the blast-box, and a collecting device for collecting molten material falling out of said apertures, of independent means for producing a hot flame playing on the surface of the molten material in the collecting device.

2. In a furnace for continuously working up a charge consisting of a mixture of reducing agents with substances containing reducible metallic compounds, a current of air passing through the charge from below upward, the combination with the reducing chamber having apertures in the bottom thereof, a blast-box located immediately below the reduction chamber, a pipe connected to the blast-box, and a collecting device for collecting molten material falling out of said apertures, of independent burners in the blast-box for producing a hot flame playing on the surface of the molten material in the collecting device.

3. In a furnace for continuously working up a charge consisting of a mixture of reducing agents with substances containing reducible metallic compounds, a current of air passing through the charge from below upward, the combination with the reducing chamber having apertures in the bottom thereof, a blast-box located immediately below the reduction chamber, a pipe connected to the blast-box, and a collecting device for collecting molten material falling out of said apertures, of independent means for producing a hot flame playing on the surface of the molten material in the collecting device, said collecting device having a tap-hole in the upper part thereof and a tap-hole in the lower portion thereof.

4. In a continuously working reduction furnace, the combination with a melting chamber and a closed wind chamber below said chamber, of a grate separating both chambers for simultaneously removing the molten slags and supplying air of combustion, an auxiliary flame below said grate for keeping the molten residues passing through said grate into the wind chamber in molten condition, and means for continuously collecting the molten mass substantially as described.

5. In a continuously working reduction furnace, the combination with a melting chamber and a closed wind chamber below said melting chamber, of a grate separating both chambers for simultaneously removing the molten slags and supplying air of combustion, an auxiliary flame below said grate for keeping the molten residues passing through said grate into the wind chamber in molten condition, and a collection chamber within the wind chamber heated by said auxiliary flame for collecting the molten mass continuously dripping from said melting chamber directly into said collection chamber, substantially as described.

In testimony whereof, I affix my signature in the presence of two witnesses.

HERMANN PAPE.

Witnesses:
ERNEST H. L. MUMMENHOFF,
FRANCIS R. STEWART.